United States Patent [19]

Kryger

[11] Patent Number: 4,562,087
[45] Date of Patent: Dec. 31, 1985

[54] GRAPEFRUIT JUICE AND PROCESS FOR PREPARING SAME

[75] Inventor: Allen C. Kryger, Holland, Mich.

[73] Assignee: Squirt & Company, Holland, Mich.

[21] Appl. No.: 619,781

[22] Filed: Jun. 11, 1984

[51] Int. Cl.$^4$ ................................................ A23L 2/02
[52] U.S. Cl. ..................................... 426/599; 426/387
[58] Field of Search .......................... 426/599, 386, 387

[56] References Cited

U.S. PATENT DOCUMENTS 3,118,776 12/1959 Byer et al. ............................ 426/387

OTHER PUBLICATIONS

Nelson et al, Fruit and Vegetable Juice Processing Technology, 1980, AVI Publishing, Westport, CT, pp. 115, 120–127, 132–137.
NAS/NRC, 1965, Chemicals used in Food Processing, pp. 142 and 232.
Furea et al, 1971, Fenaroli's Handbook of Flavor Ingredients, CRC Publishing Co., Cleveland, OH, pp. 126, 127, 484.
Furea et al, 1975, Fenaroli's Handbook of Flavor Ingredients, second edition, CRC Publishing Co., Cleveland, OH, pp. 438 and 579.
Shprtsman et al, 1979, Vinsgradarstvo I Vinobelie Moldavii 34(11)31.

Primary Examiner—Raymond Jones
Assistant Examiner—Carolyn Paden
Attorney, Agent, or Firm—Price, Heneveld, Huizenga & Cooper

[57] ABSTRACT

The specification discloses a grapefruit juice containing from about 0.007 to about 0.015% by weight of a mixture of grapefruit essence oil and five-fold grapefruit peel oil in a ratio of from about 70/30% by weight to about 80/20% by weight of said essence oil to said peel oil. The essence oil and peel oil are selected to provide the final product with from about 0.000096 to about 0.00018% by weight nootkatone and from about 0.000015 to about 0.000037% by weight linalool.

12 Claims, No Drawings

GRAPEFRUIT JUICE AND PROCESS FOR PREPARING SAME

BACKGROUND OF THE INVENTION

The present invention relates to grapefruit juice. It is especially adapted to aseptically packaged juice, but is not necessarily so limited.

Some grapefruit juice is sold fresh squeezed. Most, however, is shipped or stored in frozen concentrate form and reconstituted from frozen concenrtrate when it is to be sold.

During the juice concentration process, some volatile flavor essence vaporizes. Most producers recover the vaporized essences and add at least some back to the concentrate before freezing same. This is described, for example, in U.S. Pat. No. 3,087,822 to Smith, which issued Apr. 30, 1963 and 3,300,320 to Distelkamp, which issued Jan. 24, 1967.

Some processors also press oil from the grapefruit peels. Often, some portion of peel oil is added to the concentrate prior to freezing. This is described in U.S. Pat. No. 3,300,320 to Distelkamp which issued on Jan. 24, 1967.

These frozen concentrates are then later reconstituted by dilution with water. The problem with such reconstituted juices is that they tend to taste stale, bitter and have a characteristic processed smell. Merely adding back peel oils and flavor essence has failed to insure either fresh flavor or consistent flavor.

SUMMARY OF THE INVENTION

The present invention comprises a grapefruit juice that tastes fresher, has a very well-received blend of tanginess and sweetness, and has a fresh smell. The grapefruit juice of the present invention comprises from about 0.007 to about 0.015% of a mixture of grapefruit essence oil and five-fold grapefruit peel oil in a ratio of from about 70/30% by weight to about 80/20% by weight of said essence oil to said peel oil. Said essence oil and said peel oil are selected to provide the final product with from about 0.000096 to about 0.000018% by weight nootkatone and from about 0.000015 to about 0.000037% by weight linalool. The resulting juice has compared extremely favorably in test panel comparison with other aseptically packaged grapefruit juices.

DESCRIPTION OF THE PREFERRED EMBODIMENT

In the preferred embodiment, essence oil and five-fold peel oil in a ratio by weight of from about 70/30 to about 80/20 are added to the concentrate and water prior to pasteurization. The essence oil may be added after pasteurization by passing through a microfilter in order to remove microorganisms which would otherwise contaminate the final juice, though this is not essential. The product is then preferably packaged in a previously sterilized, aseptic package. The oils are selected so that the final product has a nootkatone level of from about 0.000096 to about 0.00018% by weight and a linalool level of from about 0.000015 to about 0.000037% by weight.

The total level of grapefruit oil in the final juice product is from about 0.007 to about 0.015% by weight. This measure can be checked using the Scott method.

This amount of oil is a mixture comprising from about 70 to about 80, and preferably about 75% by weight of said grapefruit essence oil and from about 20 to about 30, preferably about 25% by weight said five-fold grapefruit peel oil. The grapefruit essence oil is somewhat volatile while the five-fold grapefruit peel oil or, so-called "cold pressed oil" is less volatile and is recovered by pressing from the peels. The nootkatone and linalool in the product come from these oils.

The nootkatone and linalool levels in peel oil and essence oil can vary. Yet, it is undesirable to obtain the proper final levels of nootkatone and linalool for varying the peel oil and essence oil ratios outside of the ranges set forth above. To do so, may create flavor imbalances due to other flavor ingredients in these oils.

Hence, it is important that the grapefruit essence oil and the five-fold grapefruit peel oil must be selected such that the nootkatone level in the finished product is from about 0.000096% to about 0.00018% by weight and the linalool is from about 0.000015 to about 0.000037% by weight. In order to achieve this end result, the nootkatone levels in the five-fold peel oil should typically run from about 1.17 to about 2.39% by weight. The linalool in the five-fold peel oil should typically run from about 0.27 to about 0.79% by weight. Five-fold peel oil is used since the repeated redistillation drives off excess limonene and thus reduces bitterness in the final product.

In the grapefruit essence oil, the nootkatone level should typically be from about 0.95% to about 1.54% by weight. The linalool in the essence oil should run from about 0.1 to about 0.19% by weight.

The grapefruit concentrate used in the mixture is conventional. It is reconstituted with water to single strength. If the product is to be identified as a juice, the dilution would be to about 10° Brix. In a drink, citric acid and sugar might be added in place of some of the juice solids. The term "single strength" as used herein is intended to be an approximate term, applying to either a 100% juice or a juice drink.

Preferably, the concentrate, water and citrus oils are mixed and then pasteurized. For packaging in an aseptic package, i.e., one previously sterilized, the pasteurization process can be achieved more rapidly and at lower temperatures than in situations where the package is to be sterilized by the addition of the hot juice.

Grapefruit flavor essence may be added to the mixture after pasteurization. Preferably, this is added through a microfilter in order to remove microorganisms which might otherwise contaminate the pasteurized juice. The resulting product is then added to an aseptic container.

PANEL TESTING

The juice of the present invention was compared by a panel of 16 tasters with anothe extremely popular commercially available, aseptically packaged grapefruit juice. The test was done blind, and the panel was given one sample first, asked to taste it and rate the product on a 9 point Hedonic scale. They were then given a cracker to clear their palates and after several minutes were asked to taste the other sample and rate it on the same 9 point Hedonic scale. One-half of the panel was given the juice of the present invention first and the other half was given the commercial juice first.

A rating of 9 meant that the taster liked the juice extremely. A rating of 1 meant that the taster disliked the juice extremely. The juice of the present invention received an average rating of 6.25 while the commerically available, aseptic juice received an average rating of only 5.06. Using the conventional "T-test" used in sensory perception testing, it was determined that one could have a 90% confidence level in this degree of superiority of the present invention over the commerical comparison sample. A discussion of the 9 point Hedonic Scale and "T-test" evaluation can be found in "Laboratory Methods For Sensory Evaluation of Foods", Elizabeth Larmond, Canada Department of Agriculture, published 1977, publication number 1637.

Of course, it is understood that the above is merely a preferred embodiment of the invention and that various changes and alterations can be made without departing from the spirit and broader aspects thereof. For example, the term "grapefruit juice" as used herein is intended to include what might technically be referred to as a grape fruit "drink" due to the addition of other ingredients, further dilutions or the like, unless otherwise specifically limited by claim language.

The embodiments of the invention in which an exclusive property or privilege is claimed are defined as follows:

1. An improved grapefruit juice comprising a reconstituted grapefruit juice having:
   from about 0.007 to about 0.015% by weight based on said juice of a mixture of grapefruit essence oil and five-fold grapefruit peel oil in a ratio of from about 70/30% by weight to about 80/20% by weight of said essence oil to said peel oil;
   said essence oil and said peel oil being selected to provide the final product with from about 0.000096 to about 0.00018% by weight nootkatone and from about 0.000015 to about 0.000037% by weight linalool, both based on said final juice product.

2. The grapefruit juice of claim 1 wherein the ratio of said essence oil to said peel oil by weight is about 75/25.

3. The juice of claim 2 in which said juice is aseptically packaged.

4. The juice of claim 3 wherein all of the ingredients in said juice are natural grapefruit juice ingredients and the juice is about 10° Brix.

5. The juice of claim 1 wherein all of the ingredients in said juice are natural grapefruit juice ingredients and the juice is about 10° Brix.

6. A method for producing an improved grapefruit juice, comprising the steps of:
   adding a grapefruit oil mixture comprised of a grapefruit essence oil and a five-fold grapefruit peel oil, in a ratio of from about 70:30% by weight to about 80:20% by weight of said essence oil to said peel oil, to a reconstituted grapefruit juice in an amount sufficient to yield a juice having a grapefruit oil mixture ranging from about 0.007 to about 0.015% by weight;
   selecting said essence oil and said peel oil to provide a final product with from about 0.000096% to about 0.00018% by weight nootkatone and from about 0.000015% to about 0.000037% by weight linalool, both based on said final juice product.

7. The method of claim 6 wherein the ratio of essence oil with respect to peel oil of the grapefruit oil mixture is about 75:25% by weight.

8. The method of claim 7 further comprising the step of pasteurizing said juice before said essence oil is added.

9. The method of claim 8 further comprising the step of passing said essence oil through a microfilter before it is added to said pasteurized juice in order to remove any contaminating microorganisms contained therein.

10. The method of claim 9 is which said grapefruit juice is aseptically packaged.

11. The method of claim 10 in which all of the ingredients in said juice are natural grapefruit juice ingredients, and in which the product Brix of said juice is about 10°.

12. The method of claim 6 in which all of the ingredients in said juice are natural grapefruit juice ingredients, and in which the product Brix of said juice is about 10°.

* * * * *

UNITED STATES PATENT AND TRADEMARK OFFICE
CERTIFICATE OF CORRECTION

PATENT NO. : 4,562,087
DATED : December 31, 1985
INVENTOR(S) : Allen C. Kryger

It is certified that error appears in the above-identified patent and that said Letters Patent is hereby corrected as shown below:

Column 1, line 11:

"concenrtrate" should be --concentrate--

Column 1, line 42:

"0.000018%" should be ---0.00018%--

Column 2, line 54:

"anothe" should be --another--

Signed and Sealed this

Twenty-fourth Day of June 1986

[SEAL]

Attest:

DONALD J. QUIGG

Attesting Officer  Commissioner of Patents and Trademarks